June 21, 1927.
O. A. HANFORD
1,632,963
GLASS FORMING APPARATUS
Filed March 31, 1924  3 Sheets-Sheet 2
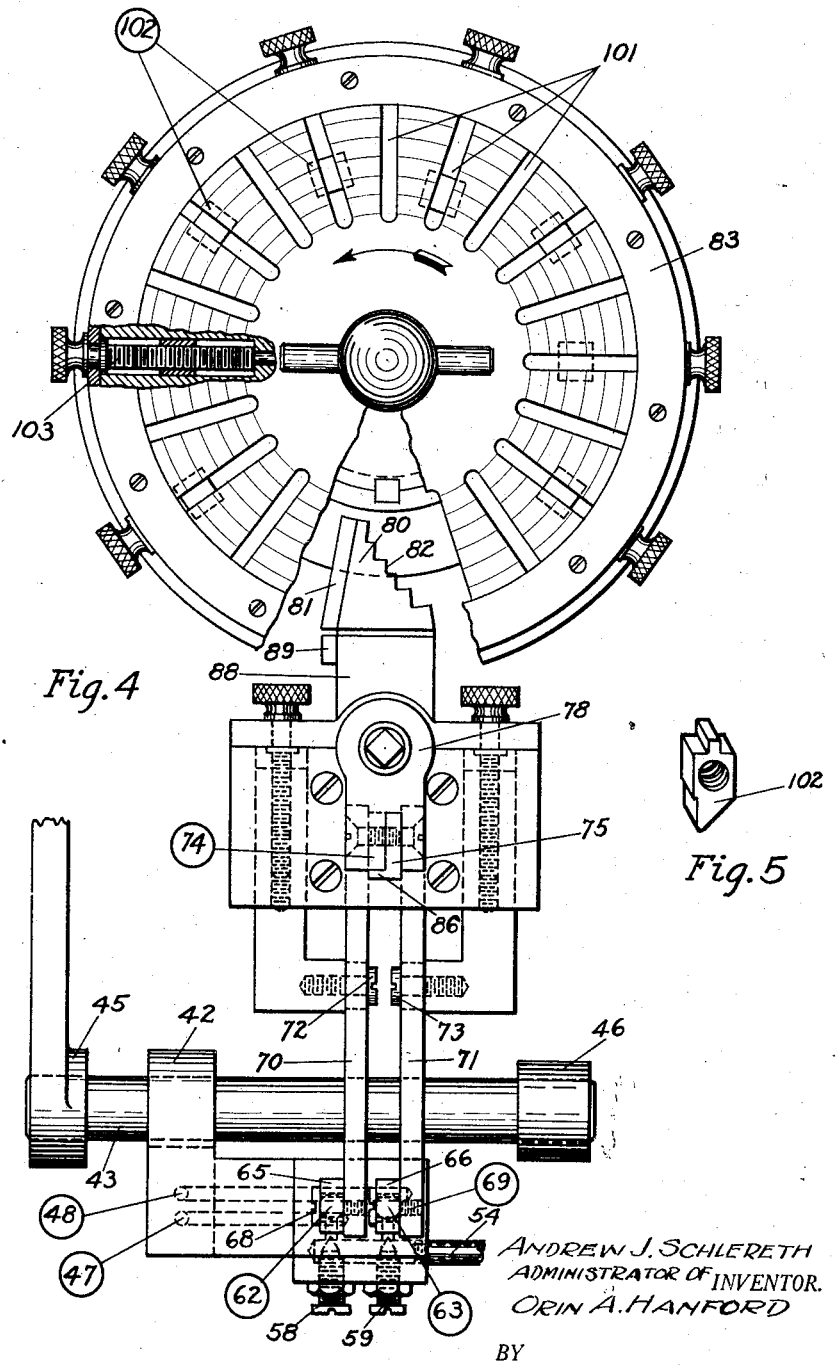

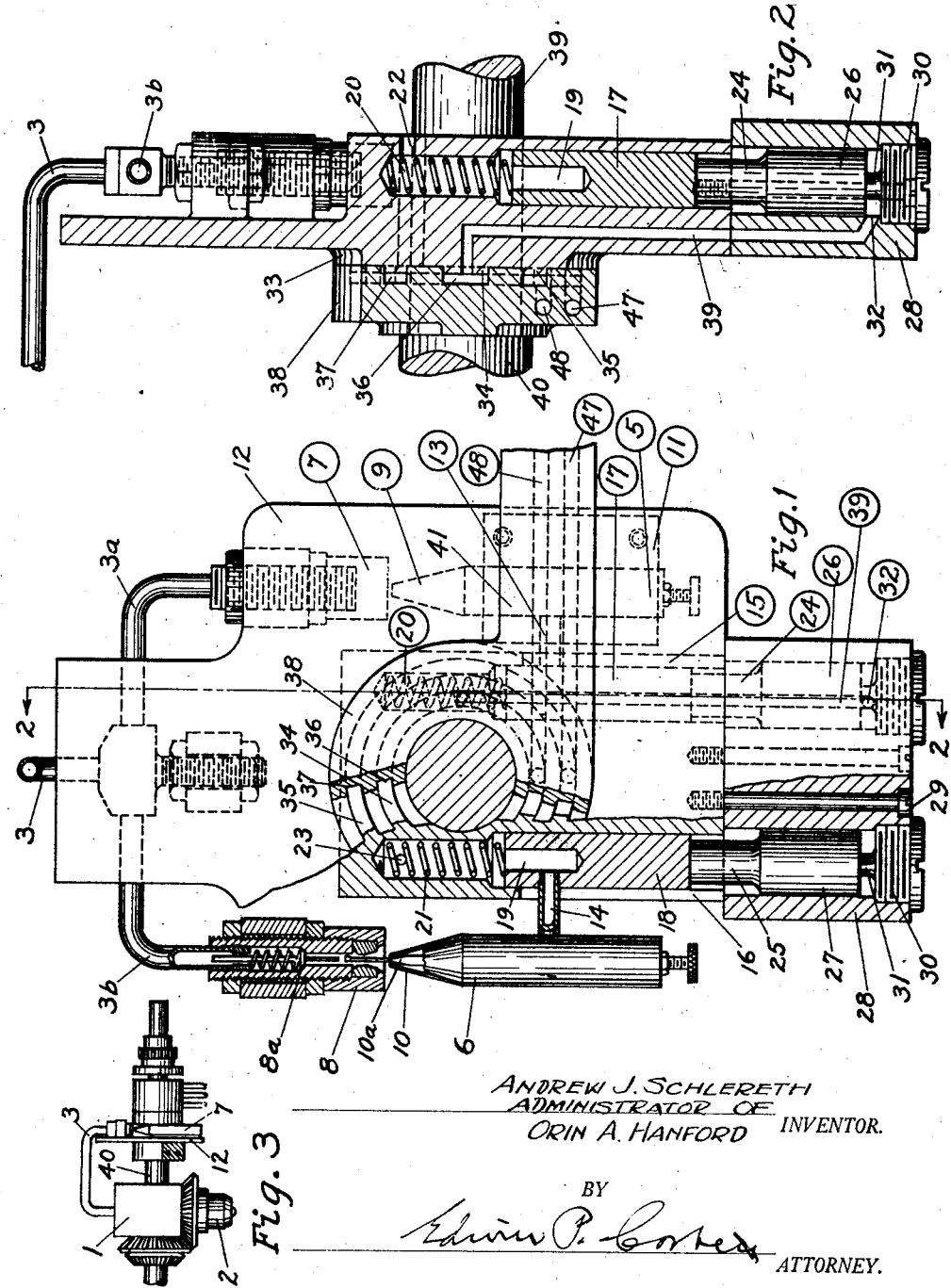

June 21, 1927. 1,632,963
O. A. HANFORD
GLASS FORMING APPARATUS
Filed March 31, 1924 3 Sheets-Sheet 3

ANDREW J. SCHLERETH
ADMINISTRATOR OF INVENTOR.
ORIN A. HANFORD
BY
Edwin P. Corter
ATTORNEY.

Patented June 21, 1927.

1,632,963

UNITED STATES PATENT OFFICE.

ORIN A. HANFORD, DECEASED, LATE OF COLUMBUS, OHIO; BY ANDREW J. SCHLERETH, ADMINISTRATOR, OF COLUMBUS, OHIO, ASSIGNOR TO THE FEDERAL GLASS COMPANY, OF COLUMBUS, OHIO, A CORPORATION OF OHIO.

GLASS-FORMING APPARATUS.

Application filed March 31, 1924. Serial No. 703,130.

This invention relates to glass forming apparatus and has particular relation to the provision of a novel method and apparatus for the introduction of air into partially formed blanks of glass both during the stages leading to the final blowing of the glass and during the final blowing and formation of the article to be produced. It is especially suitable in connection with the production of blown ware of the finer type, such as blown tumblers and electric light bulbs.

In the past, the introduction of air into the glass blank has been the cause of a high percentage of waste as a result of the nature of the air introduced and the manner of controlling the air during the introduction. Defects primarily arise from the passage of the air in contact with oiled surfaces and the condensation and sediment collected by the air on its way to the blank. Furthermore, other defects arise in the operation of the air supplying means and the control and regulation of the air supplying means to adjust the glass forming apparatus to different conditions of manufacture.

The aim is the provision of an entirely novel method of supplying the air to the glass blank which eliminates all possibility of oil or water marks being formed in the ware and which automatically controls the introduction of the air to the blank under all conditions.

This novel method is preferably accomplished by the utilization of a combination of automatically operating and controlling mechanisms located between the air supply and the means for holding the blank prior to and during its formation, and which operating and controlling mechanism is effective to intermittently introduce air to the blank without causing any stoppage in the flow thereof, to pneumatically control the apparatus for controlling the introduction of air to the blank and to automatically control the application of the air to the blank to suit the different conditions of pressure and length of application required in different kinds and sizes of blanks.

More specifically this invention comprises the provision of intermittently separable units which are continuously supplied with air, the utilization of pneumatic means for actuating and controlling the movements of the intermittently operable air units and the provision of means preferably timed relative to the motion of the other units of the glass forming machine for automatically controlling the application of the pneumatic means for subsequently controlling the intermittent application of the air structure units. These air structure units are preferably separated whenever air is not desired to reach the blank and when separated the air is designed to flow freely to the atmosphere with the result that all danger of condensation is avoided. The means for controlling the application and duration of application of the separable air structure units is designed to be automatically operated in timed relation to the actuation of the general glass forming unit and is adjustable to suit different conditions of operation and manufacture during the operation of the machine.

Various other features of this invention will be apparent as this description progresses, and will be brought out in the claims appended hereto. In performing this method it is preferred to use the apparatus shown in the appended drawings wherein similar characters of reference designate corresponding parts and wherein:

Figure 1 is a detail front elevation, partly broken away, of the apparatus for controlling the introduction of air to the blank and showing the nozzle structure and pneumatical operating means for controlling the operation of such nozzle.

Figure 2 is a detail view taken on line 22 of Figure 1.

Figure 3 is a diagrammatic illustration of the air controlling apparatus in combination with a blowing head for receiving and manipulating the glass blank during the introduction of air thereto.

Figure 4 is a front elevation, partly broken away, of the adjustable cam dial structure for automatically controlling the pneumatic operation of the nozzle elements shown in Figure 1 and also showing the manner of operatively connecting the cam structure with the means for directly operating the air controls.

Figure 5 is a detail view of one of the cam nuts forming a part of the dial shown in Figure 4.

Figures 6, 7:
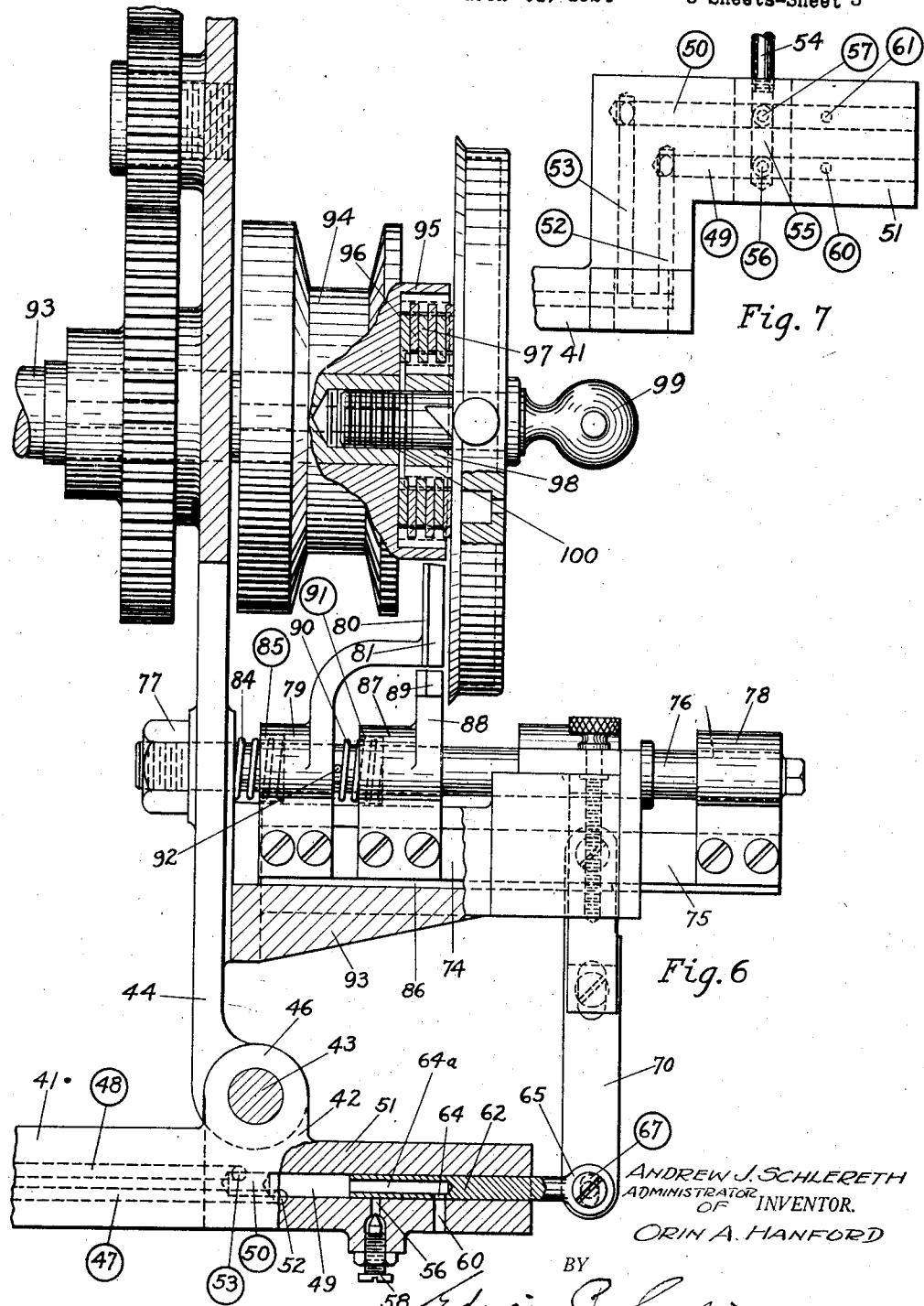
Figure 6 is a side elevation, partly in section, of the structure shown in Figure 4 and showing the manner of conducting the compressed air controlled by the units shown in Figure 4 to the nozzle structure shown in Figures 1 and 2.
Figure 7 is a fragmentary plan view of the air valve housing and showing the air passages which conduct the air to the nozzle structure.

In the drawings, the apparatus to which this invention relates is shown in detail as comprising a structure for controlling the introduction of air into glass blanks. Furthermore, the combination of this air control mechanism with a blowing head is shown diagrammatically in Figure 3 and it will be obvious from the drawings that this air control mechanism may form a part of and operate in timed relation to a complete glass forming unit.

In glass forming units for the production of blown glassware it is customary in some types of machines to initially retain the unformed glass blank in a revolvable blowing head of various forms. The purpose of this blowing head is not only to hold the glass blank in the desired position during the various manipulations but it is the means for conducting the air to the blank during its formation. This air control apparatus is therefore shown in combination with a blowing head of a single glass forming unit which is diagrammatically shown and designated 1.

This blowing head is preferably designed to be rotated about a horizontal axis, upon which same axis the air control nozzles and structure is mounted. The blowing head 1 is preferably provided with a receiving head 2 which is preferably provided with a suitable groove for the reception and holding of the glass blank during its manipulation.

The present invention relates primarily to the introduction of air through the blowing head and into the glass blank during its formation both prior to and during the final formation of the blank. In Figure 3 the blowing head 1 is shown in a vertically downward position but it will be obvious that the blowing head 2 may be rotated about a horizontal axis or may be rotated about its own longitudinal axis by means of the bevel gears as shown.

The mechanism for controlling the introduction of the puff and blow air to the glass blank preferably comprises a conduit 3 which is connected at one end to the blowing head 1 as shown in Figure 3 and at the other end to a suitable union which connects the conduit 3 with separate conduits $3^a$ and $3^b$. In the drawings this conduit $3^a$ is designed to conduct the puff air to the blank during its initial formation while the conduit $3^b$ is designed to conduct the blow air to the blank during the later stages or stage of its formation.

The operation of expanding a blank attached to a blowing head calls for a supply of puff air at certain times and at other times to the supply of blowing air, as for example, in the making of a certain type of blown ware, it is desirable to introduce several successive puffs of low pressure air into the blank immediately after marvering or formation of the initial blank and before and during subsequent elongation of the blank. The high pressure air or blow air is usually introduced into the blank to blow the article to final form.

The puff and blow air is supplied to the conduits $3^a$ and $3^b$ by means of make and break or reciprocating nozzles, one nozzle 5 being designed to co-operate with the conduit $3^a$ while another nozzle 6 is designed to co-operate with the conduit $3^b$. Broadly speaking, the air is designed to flow freely through the nozzles 5 and 6 and such nozzles are designed to be reciprocable relative to the conduits $3^a$ and $3^b$ whereby the air is only passed to the conduits when the nozzles are in a definite position. Therefore as the air is either passing through the blank or to the atmosphere there is no stoppage of air movement with the result that there is no deposit of sediment or other foreign substance in the conduit and there is no condensation during the passage of the air to produce any water marks in the ware.

Each nozzle structure preferably takes the form of a substantially cylindrical casing with the one end tapered as at 9 and 10. The conduits $3^a$ and $3^b$ are provided with socket-like terminals 7 and 8 which are also preferably provided with conical seats for the reception of the conical ends 9 and 10 of the sockets. As best shown in Figure 1 the nozzles 5 and 6 are disposed longitudinally relative to the terminals 7 and 8 and such nozzles are shown suitably mounted in guides 11 which form a part of a supporting plate 12.

Connected to the outer casing of the nozzles 5 and 6 are lateral projecting conduits 13 and 14 which extend into slots 15 and 16. These conduits 13 and 14 are threaded into cylindrical conduit members 17 and 18 which are designed to have one end open as at 19 connecting with the conduits 14 and 15. The cylindrical members 17 and 18 are normally held at the end of their stroke by means of coil springs 20 and 21.

Air is introduced into the interior of these conduits 17 and 18 and consequently into the nozzles 5 and 6 by means of suitable ducts 22 and 23. It will be understood that the duct 22 may be continuously connected with suitable means for supplying it with a low pressure or puff air while the duct 23 may be connected with a separate means for continuously supplying the nozzle 6 with relatively high pressure or blow air.

The closed ends of the conduit members 17 and 18 rest upon reduced portions 24 and 25 of piston members 26 and 27. These pistons 26 and 27 operate within a cylinder block 28 which is held to the supporting plate 12 by means of suitable screws 29. The outer end of the cylinders in the pistons 26 and 27 are closed by means of suitable screw plugs 30 provided with inwardly extending projections 31 which limit the outward stroke of the pistons 26 and 27. The cylinders are provided with suitable air ports 32 as shown in Figures 1 and 2 and extensions 31 prevent the pistons 26 and 27 from covering these air ports.

The supporting plate 12 is provided on one side with a hub 33 which in turn is provided with outstanding annular rings 34 and 35. These rings 34 and 35 are designed to register with and enter into the comparatively deep annular grooves 36 and 37 which form a part of the cylinder or plate 38. The inter-fitting of the annular extensions 34 and 35 with the grooves 36 and 37 form two annular air passages. The air passage formed by the annular extension 34 and groove 36 is connected to the port 32 by an air duct 39 which extends through the cylinder block 28 and thence through the plate 12. It will thus be obvious that by admitting compressed air through the port 32 and conduit 39, that it will be possible to force the piston 26 and the conduit member 17 inwardly with the result that the conical end 9 of the nozzle 5 will be seated in the terminal 7 of the conduit 3ª. Furthermore, it will be seen that when the pressure is released from the piston 26, the spring 20 will turn such piston and the nozzle structure to their original position. The annular passage formed by the extension 35 and the groove 37 is connected in a similar manner to admit compressed air to the outer end of the piston member 27.

The plate 38 is mounted rotatably upon a reduced extension 39 of the shaft 40 which forms an integral part of the blowing head 1 as shown in Figure 3. The supporting plate 12 is also mounted on the reduced extension 39 and is keyed thereto so as to rotate simultaneously with the blowing head. It will be obvious that the supporting plate and air controlling units may be rotated with the blowing head 1 when the glass blank is positioned at different points during its manipulation and that in view of the annular air passages between the plate 12 and the plate 38 there may be relative movement between such plates without interfering with the free passage of compressed air to operate the pistons 26 and 27. It will also be understood that, as above mentioned, any suitable structure, similar to the plate 38, may be placed on the other side of the plate 12 to continuously introduce puff and blow air to the ports 22 and 23 while the plate 12 and the blowing head are rotating.

The plate 12 is provided with an extending arm 41 as best shown in Figure 1. This arm 41 is designed to be connected by means of an upstanding ear 42 to a shaft 43, forming a part of a frame 44, as at 45 and 46. It will be understood that this frame 44 may form a part of a glass forming unit and in the form shown is designed to extend in front of the blowing head 1 and in parallel relation to the horizontal shaft 40.

Extending longitudinally through the arm 41 are air ducts 47 and 48 which connect the annular grooves 36 and 37 at one end to air valve cylinders 49 and 50 at the other end. The air valve cylinders 49 and 50 are provided in an offset integral valve housing 51 which is connected to the arm 41 and the ducts 47 and 48 by means of ducts 52 and 53. Compressed air is designed to be admitted to the air valve cylinders from a constant air line 54, as best shown in Figures 4 and 7. This air line 54 is connected to the cylinders 49 and 50 by means of an air duct 55 and suitable ports 56 and 57. The quantity of air admitted to the ports 56 and 57 is controlled by means of adjustable needle valves 58 and 59 which are threaded into the air valve housing 51.

The air valve cylinders are provided with exhaust ports 60 and 61 positioned in longitudinal alinement with the ports 56 and 57 and at a certain distance therefrom. These intake ports 56 and 57 and the exhaust ports 60 and 61 are connected and controlled by hollow valve pistons 62 and 63, which are provided at the inner end of the hollow portion with air ducts 64. This hollow portion of the pistons 62 and 63 may be designated 64ª and such air duct thus normally connects the interior cylinders 49 and 50 with the atmosphere through the exhaust ports 60 and 61, as best shown in Figure 6. It will be seen that when the openings of the pistons 62 and 63 are in alinement with the exhaust ports 60 and 61 that the intake ports 56 and 57 are covered by the pistons 62 and 63. Thus, while the pistons are in this normal position there will obviously be only atmospheric pressure on the ducts 47 and 48 and on the outer end of the pistons 26 and 27. Thus, due to the action of the coil springs 20 and 21 these pistons will be forced outwardly to normally withdraw the nozzles 5 and 6 out of contact with the terminals 7 and 8 and thus allow both the puff and blow air to flow freely to the atmosphere.

The outer end of the pistons 62 and 63 are enlarged as at 65 and 66, and slotted as at 67 whereby they can be connected by suitable studs 68 and 69 to levers 70 and 71. These levers 70 and 71 are pivoted at their upper ends to horizontally slidable bars 74 and 75.

As best shown in Figure 6 the bar 75 is slidably carried upon the rod 76 which is secured to the frame 44 as at 77. The bar 75 is secured to the rod 76 by means of guide blocks 78 and 79. The guide block 79 carries an upstanding foot structure or cam 80 which is beveled on one edge as at 81 and is provided with a series of step-like notches 82 upon the other edge, as is best shown in Figure 4. This element 81 is designed to be automatically forced rearwardly at definite intervals and for predetermined periods by means of a cam dial that may be generally designated 83.

The general action of this cam dial 83 is to press the element 80 rearwardly whereby the bar 75 and the lever 71 are actuated to withdraw the piston 63 outwardly to close the exhaust port 61 and subsequently open the air inlet port 57. This action will be effective to admit compressed air to the cylinder 50 and thence through the ducts 53 and 48 to the annular groove 36. Regardless of the position of the plate 12 and the nozzle structure relative to the plate 38 this annular groove 36 will conduct the admitted compressed air to the duct 39 and thence to the bottom of the piston element 26 whereby this piston element will be forced inwardly carrying with it the conduit member 17 and the nozzle 5 until the conical end 9 of the nozzle is seated in the terminal 7. It will be obvious that the seating of the nozzle 5 will be effective to conduct the puff air through the terminal 7 and the conduit 3ª to the glass blank as long as the nozzle is held in this seated position. It will be understood that the air may be admitted directly through the nozzle and conduits 3ª and 3 or a suitable spring pressed valve inserted in the terminals 7 and 8 to prevent the outlet of the air when either of the nozzles are retracted. As clearly shown in Figure 1 the terminal 8 is shown provided with a spring pressed valve 8ª which is designed to be unseated by means of an adjustable tapered stem 10ª carried by the nozzle 6, the conical part of the stem 10ª being designed to co-operate with the conical end 10 of the nozzle 6. It will likewise be understood that the nozzle 5 and terminal 7 are provided with a similar structure as nozzle 6 and terminal 8.

The element 80 is designed to be held in operable position by means of a coil spring embracing the rod 76 and positioned within the recess portion 85 and between the guide block 79 at one end and the frame 44 at the other end. Thus, whenever the element 80 is released by the cam dial 83 the piston 26 and valve 5 will be withdrawn and the puff air continuously admitted through the port 22 will flow freely to the atmosphere instead of through conduit 3ª.

The manner of regulating the cam dial structure 83 to determine the frequency and length of the periods that the nozzles 5 and 6 are in contact with the terminals 7 and 8 will be subsequently explained.

The bar 74 is designed to control the movements of the piston 27 and the nozzle 6 in the same manner that the bar 75 controls the movements of the nozzle 5. This bar 74 is slidably supported upon a flange 86 which forms a part of the bar 75, as clearly illustrated in Figure 4. This bar 74 is provided at its rearward end with an upstanding collar or guide member 87 which slides upon the rod 76 and which also carries a cam element or foot structure 88 which is beveled on one side as at 89. This cam or foot structure 88 is operated by the cam dial 83 in substantially the same manner as the element 80 and is maintained in its normal outward position by means of a coil spring 90 seated at one end within a recess portion 91 of the member 87 and at its other end against a retaining pin 92. The operating bars 74 and 75 are embraced by a guiding bracket 93 secured to the frame 44. The purpose of the bracket is to obviate any tendency of the cam dial 83 to rotate the collars 79 and 87 about the rod 76.

The cam dial 83 is preferably designed to be actuated by and in timed relation with the operating parts of the glass forming machine as a unit. In Figure 6 is shown a shaft 93 which preferably forms a part of the entire glass machine unit and which shaft 93 extends through the frame 44 and is provided adjacent its outer end with a cam 94 keyed thereto. This cam 94 is generally designed for actuating the blowing head during part of its movement and does not form a part of this invention. The cam 94, however, is provided with an outstanding collar 95 which forms the outer member of a standard disc clutch structure 96, having a plurality of friction plates 97 which are alternately keyed loosely to the outer casing 95 and to a hub 98 of the cam dial 83. This disc clutch 96 is made operative by means of an adjusting nob 99 and its inwardly extending screw 100 threaded into the end of the shaft 93. It will be obvious that when the nob 99 is screwed inwardly sufficient pressure will be exerted to press the discs 97 together and cause the cam dial 83 to revolve in unison with the operating shaft 93. It will be seen that there is provided a very simple and positive means for changing the position of the cam dial 83 relative to the shaft 93 whereby the cam dial 83 may be adjusted to actuate the cam elements 81 or 88 at different times and for different durations independently of the rotation of the actuating shaft 93.

Referring particularly to Figure 4 the cam dial 83 is provided with a plurality of radial slots 101 within which slots are mounted suitable cam nuts 102, each slot being preferably provided with one cam nut. Each cam element 102 is adjustable along its slot 101 and radially of the dial by means of a screw rod 103. The face of the cam dial 83, adjacent the slots 101, is preferably graduated and marked so that the cam elements 102 may be set in any desired graduation. Under the usual conditions of operation, certain of these cam nuts are adjusted to contact with the cam element or foot 80 to render the puff air effective at predetermined intervals. Other cam nuts are adjustable along the slots 101 to contact with and operate the lower cam element 88.

The contacting surface of the cam nuts 102 are preferably beveled complemental to the beveled surfaces 81 and 89 of the cam elements 80 and 88 respectively. Thus, a cam element in one slot may be moved towards the center of the cam dial 83 so that it will strike the cam element 80 at its narrowest top portion with the result that the cam element 80 will only be retracted and the nozzle 5 will only be moved into operative position during the time it takes such cam element to pass over the relatively narrow surface of the top part of the cam element 80. Another cam nut 102 may be positioned to strike the cam element 80 to co-operate with any one of the steps on such element as soon as the cam nut above described had passed by the cam element 80. Or it will be obvious that a second cam nut may strike the cam element 80 before the preceding cam nut has released the cam element with the result that the cam element or foot 80 would be retracted an additional length of time to admit the puff air to the glass blank. Furthermore, it will be obvious that the same cam nut may be adjusted radially of its slot 101 to vary the duration of the puff air at that particular period. Thus, by adjusting the cam nuts along the slots 101 to co-operate with different points on the stepped cam element 80 it is possible to secure any desired number or combination of "puff air" periods, so that the puff air may be admitted to the blank at any time during its manipulation and for any length of time at such periods of admission. The cam nuts 102 may be rendered inoperative by moving them radially inward so as to miss the top of the cam element 80. It will further be obvious that by providing the cam dial face with graduations that any predetermined set of conditions may be obtained or maintained by merely adjusting the cam nuts to correspond with the desired graduations which may be charted or otherwise marked to indicate the positions of the cam nuts to properly produce a certain blown glass article.

One cam nut is ordinarily utilized and positioned near the periphery of the cam dial for controlling the operation of the cam element 88 which in turn will control the position of the blowing air nozzle 6 into operative relation with the blowing air terminal 8. However, it will be understood that the blowing period may be prolonged by positioning a plurality of successive cam nuts at the extreme outward position in the slots 101 so that they will contact with and force the cam element 88 rearwardly for a relative long period, as they are rotated by the dial into contact with such cam element.

Although it does not form a part of the present invention, it will be understood that in conducting the compressed air to the glass blank that this air is impregnated with a definite amount of moisture in order to control the expansiveness of such compressed air after it has been introduced into the glass blank. The primary result of introducing moisture impregnated air to the blank is that such air will expand more slowly and to a greater extent and will continue to expand for a greater length of time than if it were not moisture impregnated. It will be understood that the compressed air may be moistened either before it enters the ports 22 and 23 of the nozzle structure or after it has entered into the nozzles 5 and 6 where it may be combined with moisture which may be conducted into the nozzles in any suitable manner.

In operation, the cam dial 83 is clamped to the shaft 93 in a certain predetermined relation to such shaft and the cam nuts 102 adjusted radially of their respective slots so as to contact with the cam or foot elements 80 and 88. Suitable means is provided which will continuously introduce puff air into the inlet port 23. Thus, while the nozzles 5 and 6 are retained in their normal positions by means of springs 20 and 21, puff air and blowing air will continuously flow through the conical outlets 9 and 10 of the nozzles into the atmosphere. Assuming that a molten glass blank is inserted in the groove or other holding means of the blank receiving head 2 and that the blowing head 1 is rotated about its shaft 40 by means in timed relation to the shaft 93 then one of the cam nuts 102 will come in contact with the cam element 80 and move such element rearwardly so as to move the piston element 63 outwardly. This outward movement of the piston 63 will close the exhaust port 61 and open the compressed air inlet port 57.

While this port 57 is uncovered compressed air will flow through the conduits 50, 53 and 48 to the annular groove 36 from where such compressed air will pass through the conduit 39 to the outer end of the puff air piston 26. This piston 26 will thus be moved inwardly towards the shaft 40 to operate the element 17 and the attached nozzle 5. The nozzle 5 will be moved into seating relation with the terminal 7 whereby the puff air continuously admitted to the port 22 will be cut off from the atmosphere and will enter the glass blank through the conduits 3ª and 3 regardless of the relative position of the supporting plate 12 and the plate 38. The nozzle 5 will be maintained in operation with the terminal 7 as long as the cam element 80 is pressed rearwardly by one or more of the cam nuts 102. As soon as the cam element 80 is released by any cam nut the piston 63 will be automatically moved inwardly to cover the inlet port 57 and to open the exhaust port 61 whereby the spring 20 will force the piston 26 outwardly and thus separate the nozzle 5 from the terminal 7. Obviously this operation will be repeated at different times and for different durations dependent upon the period and length of time that any cam nut 102 contacts with and moves the cam element 80. The operation of the different elements which control the reciprocation of the nozzle 6 in contact with the terminal 8 is substantially the same as the elements as above described and it will be noted that any positive actuation of the cam element 88 will automatically and pneumatically effect the movement of the nozzle 6 into operative relation with the terminal 8 at any desired period and for any desired length of time.

It will be seen that there is provided an extremely simple but positive acting device for intermittently admitting either puff air or blowing air to a glass blank and at the same time positively preventing the introduction of any sediment, oil or other foreign material and preventing the introduction of any condensed moisture. It will be further obvious that there is also provided novel controlling means adjustable in timed relation to the operation of the general glass forming device and adjustable in itself to control the time of introduction and the length of introduction of puff air or blowing air to the glass blank and which means is also effective to adjustably and pneumatically control the intermittent operation of the nozzles for the introduction of the puff and blowing air independently of the passage of such puff and blow air through the nozzles and independently of the position that the nozzle supporting structure may assume during the manipulation of the glass blank.

Having thus described this invention what is claimed is:

1. Means for introducing fluid to glass blanks comprising a conduit leading to the blank retaining head, a normally closed valve in said conduit, a nozzle through which fluid is passing continuously and pneumatic means for intermittently moving said nozzle into co-operative relation to said conduit.

2. Means for introducing fluid to a glass blank comprising a plurality of nozzles for introducing fluids of different pressures to the blank and pneumatic means for controlling the movement of said nozzles.

3. Means for introducing fluid to a glass blank comprising a plurality of nozzles for introducing fluids of different pressures to the blank and pneumatic means for moving said nozzles alternately.

4. Means for introducing fluid into a glass blank comprising nozzles, a conduit leading to said nozzles, receiving heads for said nozzles and pneumatic means for alternately moving said nozzles into co-operative relation with said receiving heads.

5. Glass forming apparatus comprising make and break nozzle structure for introducing air to the blank retaining means, a check valve for controlling the introduction of the air and means for pneumatically rendering the nozzle structure effective to open the check valve.

6. Glass forming apparatus comprising movable blank retaining means rotatable cam structure and radially adjustable means on said cam structure for controlling the introduction of air to said blank during the movement of said retaining means.

7. Glass forming apparatus comprising a blank retaining means movable about a horizontal axis, a revolvable nozzle structure for automatically introducing air to said blank and radially adjustable means forming a part of a rotatable cam structure for controlling the actuation of said nozzle structure during said revolution.

8. In glass forming apparatus having means for pneumatically controlling the introduction of air to the glass blank, the combination of a cam having adjustable cam contact surfaces with co-operating step element upon which said cam surfaces operate whereby the amount of air introduced into each successive blank may be predetermined.

9. In glass forming apparatus having means for pneumatically controlling the introduction of air to the glass blank, the combination of a cam having radially adjustable cam contact surfaces with co-operating step element upon which said cam surfaces operate, the time of contact between the cam surface and the step element determining the period of introduction of air to the blank.

10. In glass forming apparatus having means for pneumatically controlling the introduction of fluid to a glass blank, the combination of a disc member and cam contact points adjustable radially of said disc to relatively different positions or to the same points, of a stepped element upon which said cam surfaces operate, the time of contact between the cam surface and the step element determining the period of introduction of air to the blank.

In testimony whereof I hereby affix my signature.

ANDREW J. SCHLERETH,
*Administrator of the Estate of Orin A. Hanford, Deceased.*